C. D. WHEELER.
Grooming Machine.

No. 26,313.

Patented Nov. 29, 1859.

Attest
D. L. Rowland
Geo. Dingin

Inventor
C. D. Wheeler

UNITED STATES PATENT OFFICE.

CALVIN D. WHEELER, OF NEW YORK, N. Y.

MACHINE FOR CLEANING ANIMALS.

Specification of Letters Patent No. 26,313, dated November 29, 1859.

*To all whom it may concern:*

Be it known that I, CALVIN D. WHEELER, of the city, county, and State of New York, have invented a new and Improved Machine for Cleaning Animals; and I do hereby declare the following to be a full, clear, and exact description thereof, reference being had to the accompanying drawings, and to the letters of reference thereon making part of this specification.

Figure 1:
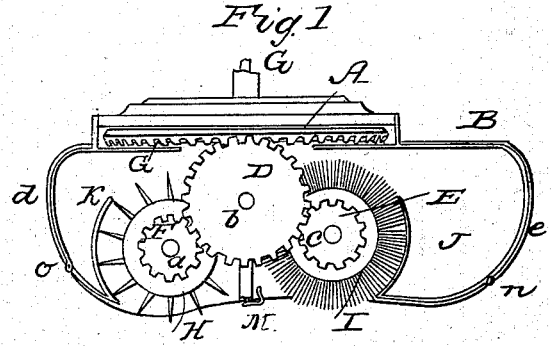
Figure 2:
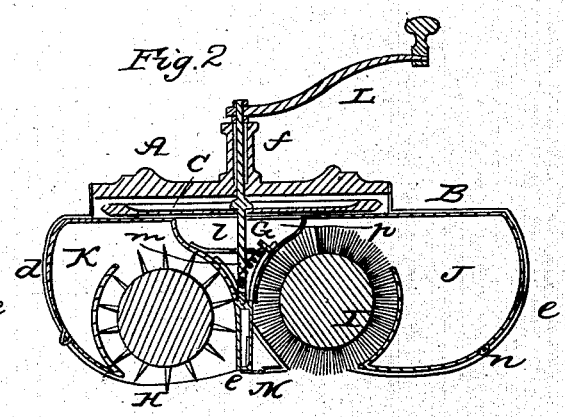
Figure 3:
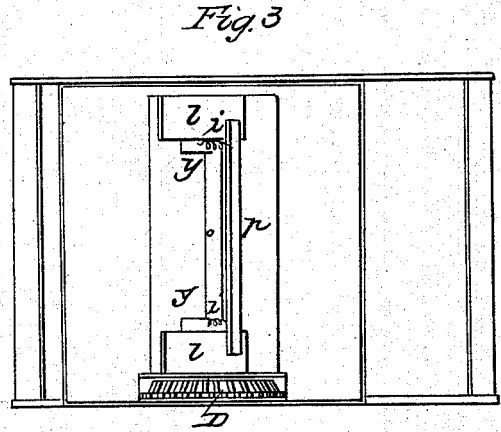
Figure 4:
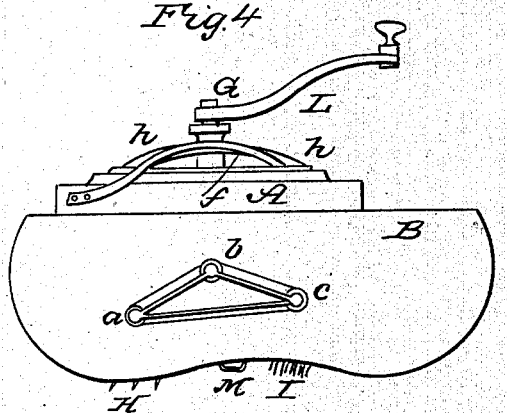

Of the said drawings Figure 1, denotes an end elevation with the case or shell removed to show the comb wheel, brush and gearing. Fig. 2, is a vertical longitudinal section of the same. Fig. 3, is a top view having the main driving gear removed. Fig. 4, is an end elevation.

Similar letters of reference indicate like parts in all the drawings.

Heretofore the operation of cleaning animals has been performed by carding or currying the animal and then brushing the surface which two operations consume much time and labor.

The nature and object of my invention consists in combining and arranging with a portable case a rotating comb wheel and brush, operated by proper mechanism whereby I am enabled to comb and brush the surface of animals at a single operation perfectly and very rapidly and prevent the escape of dust.

To enable others skilled in the art to make and use my invention I will describe its construction and operation.

A represents a plate which is secured to a metallic shell B.

C is the main driving wheel secured to the shaft G which has its bearings at ($f$) and ($g$).

D is an intermediate gear for propelling the comb wheel and brush gears F and E.

H, is the comb and I, the brush.

J and K, are the receiving dishes for the dirt and dust.

L is a winch or handle for operating the machine.

M is a spring plate which rests on the surface of the animal and is held thereto by means of spiral springs ($j$ $j$,)—arranged for this purpose which are secured to the pieces ($m$) and ($p$) and operate the rod ($i$) as shown in Fig. 2.

The letters ($v$ and $q$) indicate braces to support portions of the shell which partly cover the wheels.

The operation is as follows: The operator grasps the machine by passing the hand through the straps (or bands $h$ $h$) (shown in Fig. 4,) the fingers straddling the shaft bearing ($f$) and presses it to the surface of the animal sufficiently hard; and then with the other hand propels the machine by means of the handle L which rotates the wheels H and I by means of the gears C D E and F.

The gear D rotates on a journal ($b$) as seen in Figs. 1 and 4, and the gears E and F, are secured to the shafts ($a$) and ($c$) of the comb wheel and brush.

The comb will scratch up the matted hair of the animal and free it from the coarse dirt or other material on the surface which is carried forward with the comb and deposited in the receptacle K, while the brush will take out all the dust and deposit it in the receptacle J. These receptacles have doors ($d$ and $e$) which are hinged or jointed at ($n$) and ($o$) as shown in Figs. 1 and 2, for the purpose of emptying the dirt.

Having thus described my improved machine for cleaning animals what I claim and desire to secure by Letters Patent is—

Arranging and combining with a portable case or frame a rotating comb and brush substantially as set forth and for the purposes specified.

C. D. WHEELER.

Witnesses:
D. G. ROWLANDS,
C. A. DURGIN.